(12) United States Patent
Huang et al.

(10) Patent No.: US 8,898,292 B2
(45) Date of Patent: Nov. 25, 2014

(54) DETERMINATION OF UNAUTHORIZED CONTENT SOURCES

(75) Inventors: Cheng Huang, Redmond, WA (US); David A. Maltz, Bellevue, WA (US); Jin Li, Bellevue, WA (US); Ming Zhang, Redmond, WA (US); Chao Zhang, Brooklyn, NY (US); Keith W. Ross, New York, NY (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 13/219,581

(22) Filed: Aug. 26, 2011

(65) Prior Publication Data

US 2013/0054782 A1    Feb. 28, 2013

(51) Int. Cl.
G06F 15/173 (2006.01)
H04L 29/06 (2006.01)
H04L 29/12 (2006.01)

(52) U.S. Cl.
CPC ............ *H04L 61/1511* (2013.01); *H04L 63/12* (2013.01); *H04L 63/1408* (2013.01); *H04L 2463/146* (2013.01)
USPC ....................................................... 709/224

(58) Field of Classification Search
USPC ....................................................... 709/224
See application file for complete search history.

(56) References Cited

U.S. PATENT DOCUMENTS

| | | | |
|---|---|---|---|
| 7,634,809 B1 | 12/2009 | Schneider et al. | |
| 8,136,148 B1* | 3/2012 | Chayanam et al. | 726/5 |
| 8,321,949 B1* | 11/2012 | Green et al. | 726/26 |
| 8,386,622 B2* | 2/2013 | Jacobson | 709/229 |
| 2004/0088570 A1* | 5/2004 | Roberts et al. | 713/201 |
| 2007/0074019 A1* | 3/2007 | Seidel | 713/156 |
| 2008/0276313 A1 | 11/2008 | Kummu et al. | |
| 2009/0287835 A1* | 11/2009 | Jacobson | 709/229 |
| 2009/0328183 A1* | 12/2009 | Frenkel et al. | 726/11 |

OTHER PUBLICATIONS

"Beware the 'Bahama' Botnet", Retrieved May 26, 2011 at <<http://blog.clickforensics.com/?p=314>>, 3 pages.

Bilge, L., et al., "Exposure: Finding Malicious Domains Using Passive DNS Analysis", Retrieved May 26, 2011 at <<http://www.syssec-project.eu/static/page-media/3/bilge-ndss11.pdf>>, in Proceedings, NDSS'11, 18th Annual Network & Distributed System Security Symposium, Feb. 2011, San Diego, CA, USA, 17 pages.

Bolin, M., et al., "Automation and Customization of Rendered Web Pages," Retrieved May 26, 2011 at <<http://groups.csail.mit.edu/uid/projects/chickenfoot/uist05.pdf>>, In Proceedings of the 18th annual ACM symposium on User interface software and technology (2005) (UIST '05), pp. 163-172.

(Continued)

*Primary Examiner* — Jerry Dennison

(74) *Attorney, Agent, or Firm* — Ben Tabor; Kate Drakos; Micky Minhas

(57) ABSTRACT

A plurality of network addresses from a distributed client is obtained, at least a first portion of the obtained network addresses including resolved network address responses to distributed client requests for resolved network addresses corresponding to one or more network location indicators associated with a first web service. Test content is obtained, based on one or more of the network addresses included in the first portion. It is determined whether the obtained test content includes unauthorized content.

20 Claims, 10 Drawing Sheets

(56) References Cited

OTHER PUBLICATIONS

Casado, M., et al., "Peering Through the Shroud: The Effect of Edge Opacity on IP-Based Client Identification", Retrieved Aug. 22, 2011 at <<http://www.usenix.org/event/nsdi07/tech/full_papers/casado/casado.pdf >>, In 4th USENIX Symposium on Networked Systems Design & Implementation (2007) (NSDI '07), 14 pages.

Chumash, T., et al., "Detection and Prevention of Insider Threats in Database Driven Web Services", Retrieved May 26, 2011 at <<http://people.cs.vt.edu/danfeng/papers/ifiptm-09.pdff>>, in Proceedings, Third IFIP WG 11.11 International Conference on Trust Management (IFIPTM 2009) pp. 117-132.

Dagon, D., et al., "Corrupted DNS Resolution Paths: The Rise of a Malicious Resolution Authority", Retrieved Aug. 22, 2011 at <<http://www.citi.umich.edu/u/provos/papers/ndss08_dns.pdf>>, In Proceedings of the 15th Annual Network and Distributed System Security Symposium (Feb. 2008), (NDSS '08), 15 pages.

Gennaro, R., et al., "How to Sign Digital Streams", Retrieved Aug. 22, 2011 at <<http://www.sciencedirect.com/science?_ob=MImg&_imagekey=B6WGK-4582D05-2S-1&_cdi=6825&_user=10&_pii=S089054010092916X&_origin=browse&_zone=rslt_list_item&_coverDate=02%2F25%2F2001&_sk=998349998&wchp=dGLbVzz-zSkWz&md5=0c15a84a452a4b240d4f11df4fee78c8&ie=/sdarticle.pdf>>, Inf. Comput. 165 (Feb. 2001), pp. 100-116.

"Google Public DNS", Retrieved May 26, 2011 at <<http://code.google.com/speed/public-dns/>>, 2 pages.

Guha, S., et al., "Challenges in Measuring Online Advertising Systems", Retrieved Aug. 22, 2011 at <<http://saikat.guha.cc/pub/imc10-ads.pdf>>, In Proceedings of the 10th annual conference on Internet measurement (Nov. 2010) (IMC '10), pp. 81-87.

Holz, T., et al., "Measuring and Detecting Fast-Flux Service Networks", Retrieved May 26, 2011 at <<http://www.isoc.org/isoc/conferences/ndss/08/papers/16_measuring_and_detecting.pdf>>, In Proceedings of 15th Network & Distributed System Security Conference (NDSS 2008), Internet Society, 12 pages.

Huang, C., et al., "Measuring and Evaluating Large-Scale CDNs", Retrieved May 26, 2011 at <<http://www.cs.brown.edu/courses/csci2950-u/papers/CDN-measuring-IMC08-huang.pdf>>, Microsoft Research Technical Report MSR-TR-2008-106 (2008), 14 pages (full paper withdrawn from ACM Internet Measurement Conference, IMC'08).

Huang, C., et al., "Public DNS System and Global Traffic Management", Retrieved Aug. 22, 2011 at <<http://docs.google.com/viewer?a=v&q=cache:yugmTAzUldoJ:mmlab.snu.ac.kr/xe/%3Fmodule%3Dfile%26act%3DprocFileDownload%26file_srl%3D129540%26sid%3D8fc66b086bba500abf0203e14f3dce6c+Public+DNS+system+and+Global+Traffic+Management&hl=en&gl=us&pid=bl&srcid=ADGEESh2n643GietMxEOeDqRmrPNGZN2XypQ-M-BWGaO7Wgz5aGn2ICJ0pjgjQ57zTYuAyy5C8BKiGZQYaOPm0fQh4_Ye8J4MZktJVew-> pp. 2615-2653.

"ISP WideOpenWest Sued for Installing Spyware on Network for 3rd Party Advertisers", Retrieved May 26, 2011 at <<http://www.clevelandleader.com/node/12290>>, ClevelandLeader (Dec. 2009), 4 pages.

Kiciman, E., et al., "AjaxScope: A Platform for Remotely Monitoring the Client-side Behavior of Web 2.0 Applications", Retrieved Aug. 22, 2011 at <<http://research.microsoft.com/en-us/groups/rad/sosp07.pdf>>, In 21st ACM SIGPOS Symposium on Operating Systems Principles (2007) (SOSP '07), 14 pages.

Kounavis, M., et al., "Encrypting the Internet", Retrieved Aug. 22, 2011 at <<http://security.riit.tsinghua.edu.cn/mediawiki/images/b/b9/Encrypting_the_internet.pdf>>, In ACM SIGCOMM'10, Aug. 30-Sep. 3, 2010, New Delhi, India, pp. 135-146.

Kreibich, C., et al., "Netalyzr: Illuminating the Edge Network", Retrieved Aug. 16, 2011 at <<http://www.icsi.berkeley.edu/pubs/networking/netalyzrilluminating10.pdf>>, In Proceedings of the 10th annual Conference on Internet Measurement (2010), (IMC '10), Nov. 1-3, 2010, Melbourne, Australia, 14 pages.

"NebuAd", Retrieved May 26, 2011 at <<http://en.wikipedia.org/wiki/NebuAd>>, From Wikipedia, 9 pages.

"Open DNS", Retrieved May 26, 2011 at <<www.opendns.com>>, 2 pages.

Peng, T., et al., "Proactively Detecting Distributed Denial of Service Attacks Using Source IP Address Monitoring", Retrieved May 26, 2011 at <<http://citeseerx.ist.psu.edu/viewdoc/download?doi=10.1.1.112.5832&rep=rep1&type=pdf>>, In Proceedings of the Third International IFIP-TC6 Networking Conference (2004) (NETWORKING'2004), 12 pages.

Perdisci, R., et al., "Detecting Malicious Flux Service Networks through Passive Analysis of Recursive DNS Traces", Retrieved May 26, 2011 at <<http://ieeexplore.ieee.org/stamp/stamp.jsp?tp=&arnumber=5380685>>, In Proceedings of Computer Security Applications Conference (Dec. 2009) (ACSAC '09), pp. 311-320.

Reis, C., et al., "Detecting In-Flight Page Changes with Web Tripwires", Retrieved May 26, 2011 at <<http://www.icsi.berkeley.edu/pubs/networking/detectingin08.pdf>>, In NSDI'08 Proceedings of the 5th USENIX Symposium on Networked Systems Design and Implementation (2008), pp. 31-44.

Summary of ASes, Retrieved May 27, 2011 at <<http://bgp.potaroo.net/cidr/autnums.html>>, 648 pages.

Vratonjic, N., et al., "Integrity of the Web Content: The Case of Online Advertising", Retrieved Aug. 22, 2011 at <<http://citeseerx.ist.psu.edu/viewdoc/download;jsessionid=AD178480AFCAEBA20A843562F3B5F00C?doi=10.1.1.172.8621&rep=rep1&type=pdf>>, In USENIX CollSec'10 Proceedings of the 2010 International Conference on Collaborative Methods for Security and Privacy (2010), 12 pages.

"Wide Open West (WOW!)", Retrieved May 26, 2011 at <<www1.wowway.com>>, 2 pages.

"Wireshark", Retrieved May 26, 2011 at <<www.wireshark.org>>, 3 pages.

Zhang, C., et al., "Inflight Modifications of Content: Who are the Culprits?", Retrieved Aug. 22, 2011 at <<http://www.usenix.org/event/leet11/tech/full_papers/Zhang.pdf>>, LEET'11 4th USENIX Workshop on Large-Scale Exploits and Emergent Threats, Boston, MA, Mar. 29, 2011, 8 pages.

* cited by examiner

200b

(2A)
↓

- - - - - - - - - - - - - - - - - - - - - - - - - - - - -
Initiate instrumentation of an application to a plurality of devices associated
with the distributed client, the application including instructions for requesting,   212
receiving, and transmitting the resolved network addresses corresponding to
the one or more network location indicators associated with the first web
service, and for requesting, receiving, and transmitting a network address
associated with an intermediary server, the application including one or more
of a toolbar application or an add-on application
- - - - - - - - - - - - - - - - - - - - - - - - - - - - -

(2B)
↓

- - - - - - - - - - - - - - - - - - - - - - - - - - - - -
Initiate transmission of content that includes a first executable script to a
plurality of devices associated with the distributed client, the first executable   214
script including instructions for requesting, receiving, and transmitting the
resolved network addresses corresponding to the one or more network
location indicators associated with the first web service, and for requesting,
receiving, and transmitting a network address associated with an
intermediary server
- - - - - - - - - - - - - - - - - - - - - - - - - - - - -

(2C)
↓

- - - - - - - - - - - - - - - - - - - - - - - - - - - - -
Determine a candidate source of the unauthorized content, based on a result   216
of the determining whether the obtained test content includes unauthorized
content
- - - - - - - - - - - - - - - - - - - - - - - - - - - - -
↓
- - - - - - - - - - - - - - - - - - - - - - - - - - - - -
Determine whether the obtained test content includes unauthorized content   218
based on determining whether the obtained test content includes
unauthorized content, based on an analysis of authorized content associated
with the first web service
- - - - - - - - - - - - - - - - - - - - - - - - - - - - -

A set of the obtained plurality of network addresses from the distributed client is obtained based on one or more of receiving a transmission of the set based on execution of a Java application embedded in web page content, or receiving a transmission of the set from an add-on application instrumented on at least one client device associated with a testing web service  — 240

Determine a candidate source of the unauthorized content based on determining whether a device hosting the distributed client that is associated with receipt of unauthorized content includes executable code that is configured to intercept DNS queries and provide unauthorized responses  — 242

FIG. 2e

DETERMINATION OF UNAUTHORIZED CONTENT SOURCES

BACKGROUND

Users of electronic devices are increasingly relying on online services for many aspects of daily life. For example, users may rely on search results from online search services for making informed decisions regarding purchases, education, or travel plans. Online services may also provide news reports, ratings, descriptions of items, announcements, sponsored advertisements, event information, and other various types of information that may be of interest to the users. Thus, online service providers may desire that users may reliably access the true online service, receiving data sent by the service, without modification by intermediaries.

SUMMARY

According to one general aspect, a system may include an address collection component that obtains a plurality of network addresses from a distributed client, at least a first portion of the obtained network addresses including resolved network address responses to distributed client requests for resolved network addresses corresponding to one or more network location indicators associated with a first web service. The system may also include a test content collection component that obtains test content based on one or more of the network addresses included in the first portion. The system may also include an unauthorized content determination component that determines whether the obtained test content includes unauthorized content. The system may also include a source determination component that determines a source of the unauthorized content, based on a result of the determining whether the obtained test content includes unauthorized content.

According to another aspect, a plurality of network addresses from a distributed client may be obtained, at least a first portion of the obtained network addresses including resolved network address responses to distributed client requests for resolved network addresses corresponding to one or more network location indicators associated with a first web service. Test content may be obtained based on one or more of the network addresses included in the first portion. It may be determined whether the obtained test content includes unauthorized content.

According to another aspect, a computer program product tangibly embodied on a computer-readable storage medium may include executable code that may cause at least one data processing apparatus to receive a first network address associated with an intermediary server, based on a result of a distributed client first request, via the intermediary server, for a first network address associated with the intermediary server. Further, the at least one data processing apparatus may receive a resolved network address, based on a distributed client second request, via the intermediary server, for a second resolved network address associated with a second network location indicator associated with a first web service. Further, the at least one data processing apparatus may obtain test content based on accessing the second resolved network address. Further, the at least one data processing apparatus may determine, via a device processor, whether the obtained test content includes unauthorized content, based on a comparison with authorized content associated with the first web service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

Online services such as BING, YAHOO!, and GOOGLE may desire that users who want to reach them, are able to access the true service and receive data sent by the service without modification by intermediaries. However, many online service users may receive replies from online services (e.g., BING and GOOGLE searches) that have been modified by intermediate systems. Many of these modifications may be malicious, and may involve directing the user's query to another search engine, modifying the search links returned, modifying advertisements shown on a returned page, or modifying which pages are linked off the returned page.

Example techniques discussed herein may provide information regarding sources of unauthorized content modification (e.g., hijacking of online service content).

Figure 1:
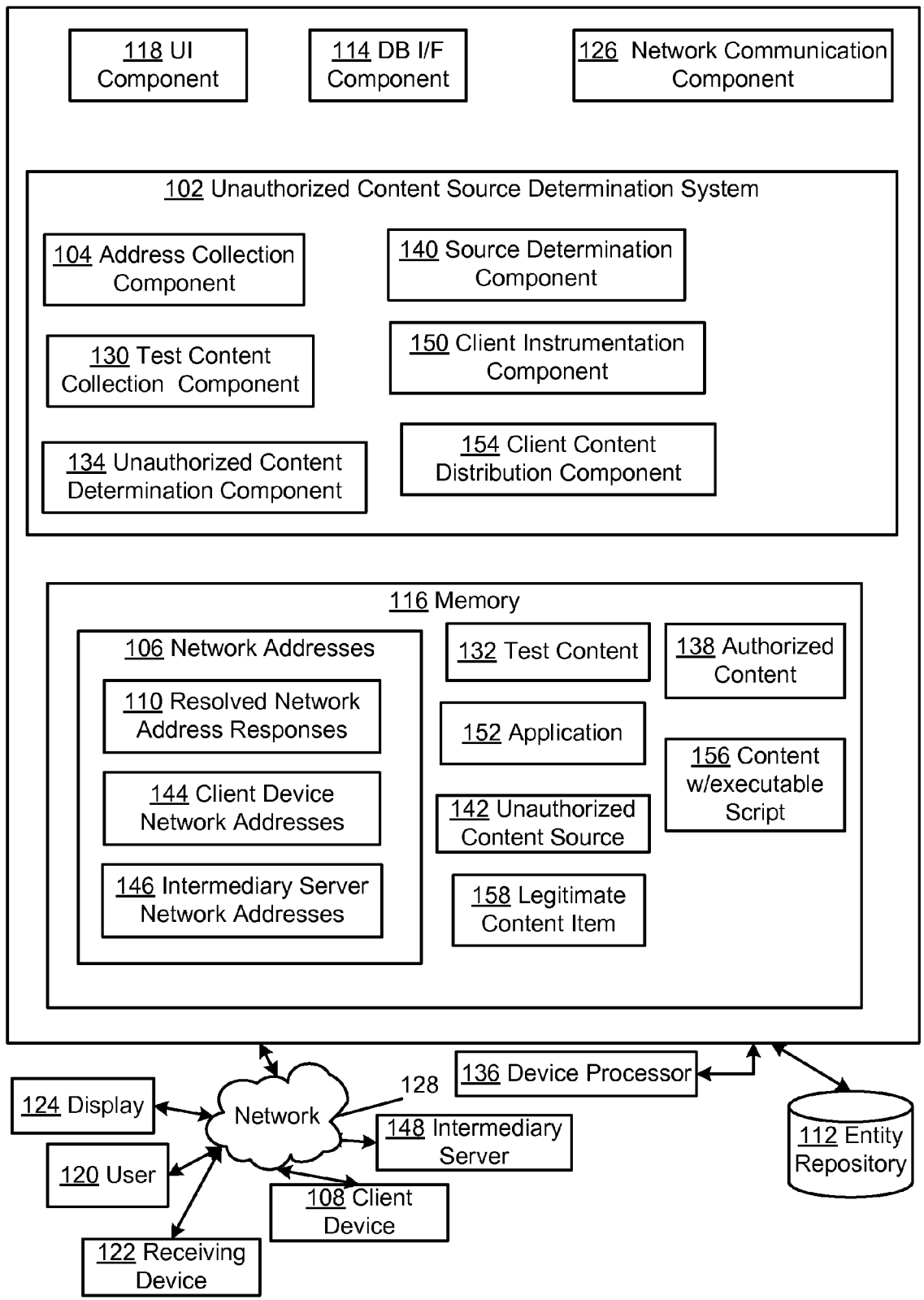
FIG. 1 is a block diagram of an example system for unauthorized content source determination.

As further discussed herein, FIG. 1 is a block diagram of an example system 100 for unauthorized content source determination. As shown in FIG. 1, a system 100 may include a unauthorized content source determination system 102 that includes an address collection component 104 that obtains a plurality of network addresses 106 from a distributed client 108, at least a first portion of the obtained network addresses 106 including resolved network address responses 110 to distributed client requests for resolved network addresses corresponding to one or more network location indicators associated with a first web service. For example, the network addresses may include Internet Protocol (IP) addresses that may include resolved network addresses associated with Uniform Resource Locators (URLs) associated with a first web service (e.g., www.bing.com, www.google.com). For example, the resolved network address responses may include responses to distributed client requests for resolved network addresses via one or more Local Domain Name Servers (LDNS's), as discussed further below.

In this context, a "distributed client" may include a plurality of clients associated with a service such as a web service. For example, a distributed client may include a plurality of clients hosted by a plurality of distributed client devices located at a plurality of different locations on a network such as the Internet.

According to an example embodiment, the unauthorized content source determination system 102 may include executable instructions that may be stored on a computer-readable storage medium, as discussed below. According to an example embodiment, the computer-readable storage medium may include any number of storage devices, and any number of storage media types, including distributed devices.

For example, an entity repository 112 may include one or more databases, and may be accessed via a database interface component 114. One skilled in the art of data processing will appreciate that there are many techniques for storing repository information discussed herein, such as various types of database configurations (e.g., SQL SERVERS) and non-database configurations.

According to an example embodiment, the unauthorized content source determination system 102 may include a memory 116 that may store the plurality of network addresses 106. In this context, a "memory" may include a single memory device or multiple memory devices configured to store data and/or instructions. Further, the memory 116 may span multiple distributed storage devices.

According to an example embodiment, a user interface component 118 may manage communications between a user 120 and the unauthorized content source determination system 102. The user 120 may be associated with a receiving device 122 that may be associated with a display 124 and other input/output devices. For example, the display 124 may be configured to communicate with the receiving device 122, via internal device bus communications, or via at least one network connection.

According to an example embodiment, the unauthorized content source determination system 102 may include a network communication component 126 that may manage network communication between the unauthorized content source determination system 102 and other entities that may communicate with the unauthorized content source determination system 102 via at least one network 128. For example, the at least one network 128 may include at least one of the Internet, at least one wireless network, or at least one wired network. For example, the at least one network 128 may include a cellular network, a radio network, or any type of network that may support transmission of data for the unauthorized content source determination system 102. For example, the network communication component 126 may manage network communications between the unauthorized content source determination system 102 and the receiving device 122. For example, the network communication component 122 may manage network communication between the user interface component 118 and the distributed client 108, or between the user interface component 118 and the receiving device 122.

A test content collection component 130 may obtain test content 132 based on one or more of the network addresses 110 included in the first portion (e.g., one or more of the resolved network addresses 110). For example, the test content 132 may be obtained via accessing one or more of the resolved network addresses 110.

An unauthorized content determination component 134 may determine, via a device processor 136, whether the obtained test content 132 includes unauthorized content. For example, the unauthorized content determination component 134 may determine whether the obtained test content 132 includes unauthorized content, based on a comparison with authorized content 138 associated with the first web service. For example, the authorized content 138 may be accessed via direct access to the first web service (e.g., via a legitimate IP address), as discussed further below.

One skilled in the art of data processing will understand that there are many techniques that may be used for determining whether the obtained test content 132 includes unauthorized content, without departing from the spirit of the discussion herein.

In this context, a "processor" may include a single processor or multiple processors configured to process instructions associated with a processing system. A processor may thus include multiple processors processing instructions in parallel and/or in a distributed manner. Although the device processor 136 is depicted as external to the unauthorized content source determination system 102 in FIG. 1, one skilled in the art of data processing will appreciate that the device processor 136 may be implemented as a single component, and/or as distributed units which may be located internally or externally to the unauthorized content source determination system 102, and/or any of its elements.

A source determination component 140 may determine a source 142 of the unauthorized content, based on a result of the determining whether the obtained test content 132 includes unauthorized content. For example, the source 142 may include a server (e.g., an LDNS or Internet Service Provider (ISP)) or malicious code resident on a client device.

According to an example embodiment, a second portion 144 of the obtained network addresses 106 may include network addresses associated with a plurality of devices hosting the distributed client 108. For example, the second portion 144 may include IP addresses associated with client devices that host clients of the first web service (e.g., clients of BING or GOOGLE).

According to an example embodiment, a third portion 146 of the obtained network addresses include network addresses associated with intermediary servers 148 in communication with one or more of the plurality of devices hosting the distributed client 108. For example, the third portion 146 may include IP addresses associated with LDNS's (e.g., LDNS's that resolve location indicators such as URLs for the client devices 108) or other intermediary servers.

According to an example embodiment, a client instrumentation component 150 may initiate instrumentation of an application 152 to a plurality of devices associated with the distributed client 108, the application 152 including instructions for requesting, receiving, and transmitting the resolved network addresses 110 corresponding to the one or more network location indicators associated with the first web service, and for requesting, receiving, and transmitting a network address associated with an intermediary server 148, the application 152 including one or more of a toolbar application or an add-on application. For example, the client instrumentation component 150 may initiate instrumentation of a toolbar application associated with a BING toolbar or a GOOGLE toolbar on the distributed client (e.g., clients associated with BING or GOOGLE).

In this context, an "add-on" application may include an extension to another application residing on a device. For example, a plugin application may be implemented as an extension to a browser application.

According to an example embodiment, a client content distribution component 154 may initiate transmission of content 156 that includes a first executable script to a plurality of devices associated with the distributed client 108, the first executable script including instructions for requesting, receiving, and transmitting the resolved network addresses corresponding to the one or more network location indicators associated with the first web service, and for requesting, receiving, and transmitting a network address associated with an intermediary server 146. For example, the first executable script may include a Java applet embedded in a web page.

According to an example embodiment, the test content collection component 130 may obtain test content 132 based on one or more of the network addresses included in the first portion 110 based on initiating access to a first test content item based on a first candidate network address included in the first portion 110, and initiating access to a first legitimate content item 158 based on a first legitimate network address associated with one or more of the network location indicators associated with the first web service.

According to an example embodiment, the unauthorized content determination component 134 may determine whether the obtained test content 132 includes unauthorized content, based on a comparison with authorized content 138 associated with the first web service, based on initiating a comparison of the first test content item 132 and the first legitimate content item 158, and determining whether the first test content item 132 includes one or more unauthorized modification items based on a result of the comparison of the first test content item 132 and the first legitimate content item 158.

Figure 2A:
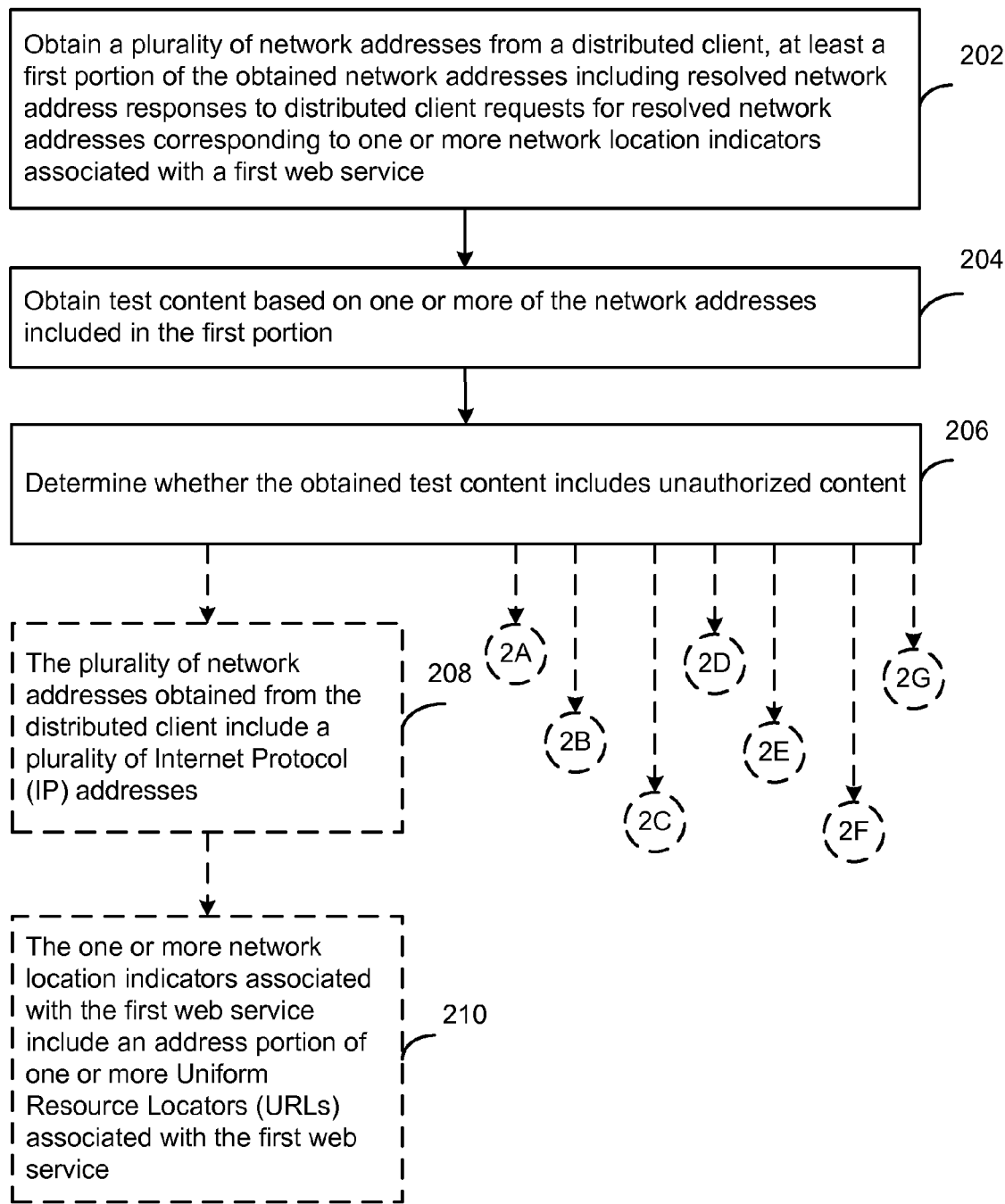
FIG. 2 is a flowchart illustrating example operations of the system of FIG. 1.
Figure 2C:
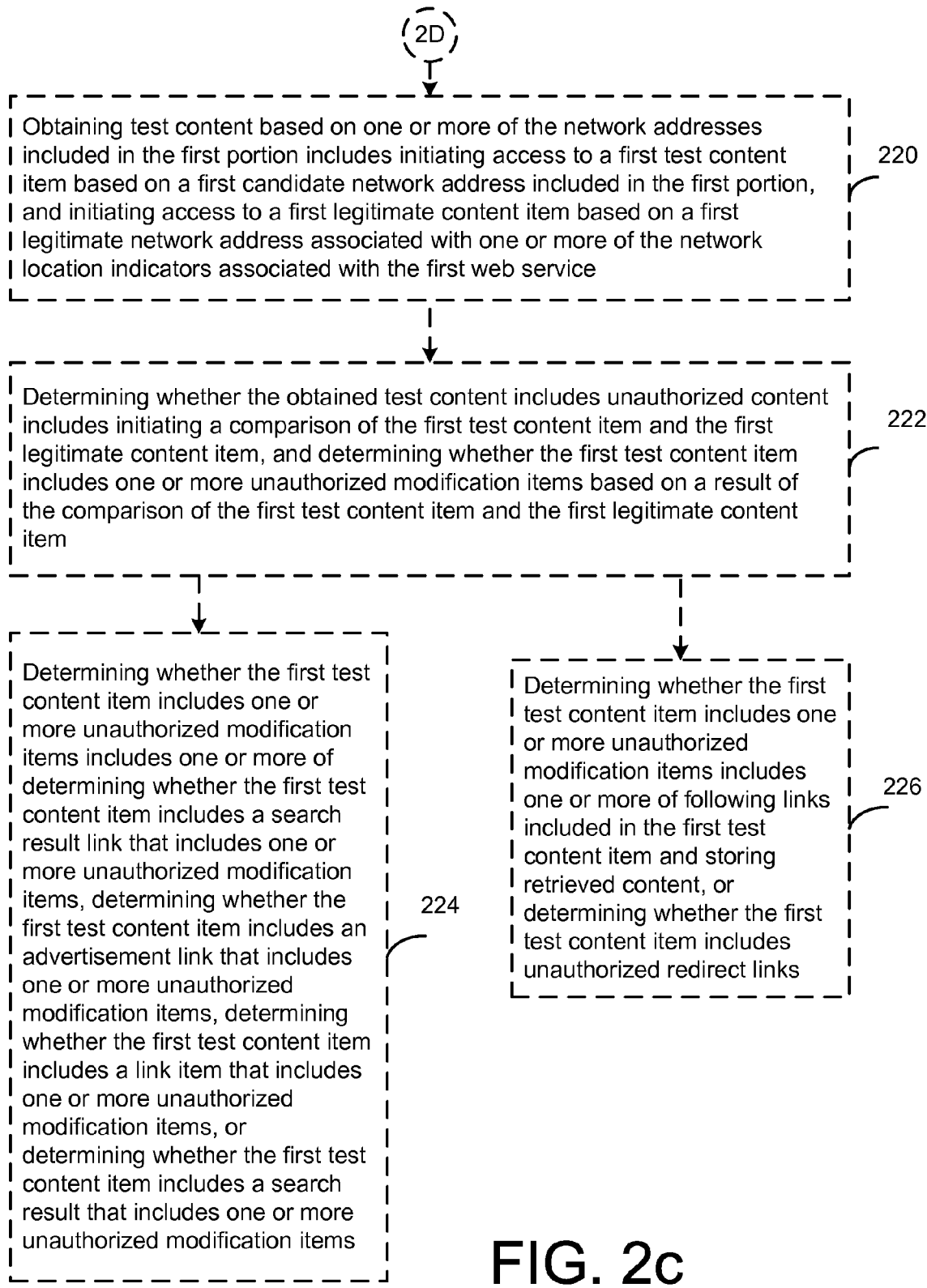
Figure 2D:
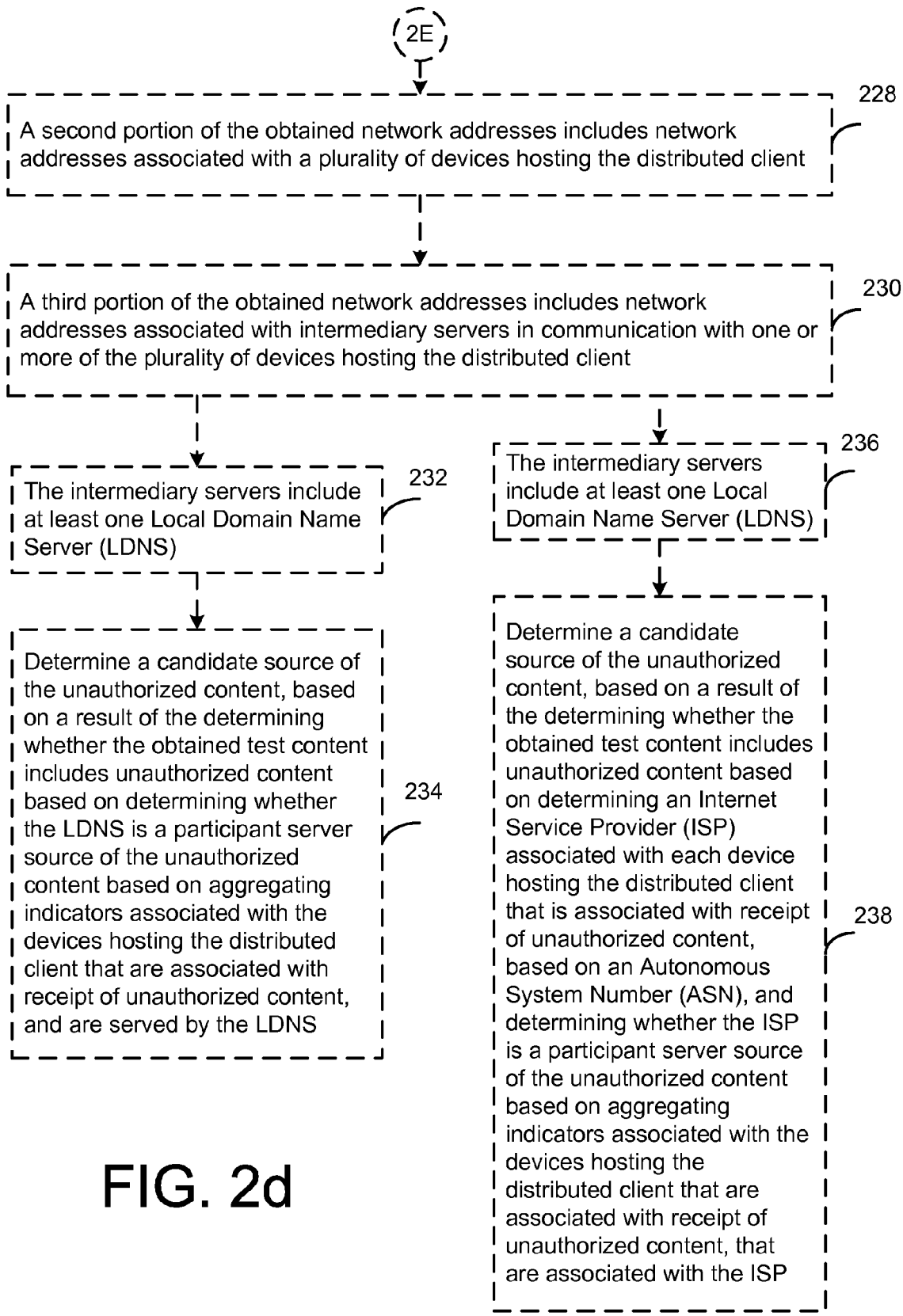

FIG. 2 is a flowchart illustrating example operations of the system of FIG. 1, according to example embodiments. In the example of FIG. 2a, a plurality of network addresses may be obtained, at least a first portion of the obtained network addresses including resolved network address responses to distributed client requests for resolved network addresses corresponding to one or more network location indicators associated with a first web service (202). For example, the address collection component 104 may obtain a plurality of network addresses 106 from a distributed client 108, at least a first portion of the obtained network addresses 106 including resolved network address responses 110 to distributed client requests for resolved network addresses corresponding to one or more network location indicators associated with a first web service, as discussed above.

Test content may be obtained based on one or more of the network addresses included in the first portion (204). For example, the test content collection component 130 may obtain test content 132 based on one or more of the network addresses 110 included in the first portion, as discussed above.

It may be determined whether the obtained test content includes unauthorized content (206). For example, the unauthorized content determination component 134 may determine, via a device processor 136, whether the obtained test content 132 includes unauthorized content, as discussed above.

According to an example embodiment, the plurality of network addresses obtained from the distributed client may include a plurality of Internet Protocol (IP) addresses (208).

According to an example embodiment, the one or more network location indicators associated with the first web service may include an address portion of one or more Uniform Resource Locators (URLs) associated with the first web service (210).

According to an example embodiment, instrumentation of an application to a plurality of devices associated with the distributed client may be initiated, the application including instructions for requesting, receiving, and transmitting the resolved network addresses corresponding to the one or more network location indicators associated with the first web service, and for requesting, receiving, and transmitting a network address associated with an intermediary server, the application including one or more of a toolbar application or an add-on application (212). For example, the client instrumentation component 150 may initiate instrumentation of the application 152 to a plurality of devices associated with the distributed client 108, the application 152 including instructions for requesting, receiving, and transmitting the resolved network addresses 110 corresponding to the one or more network location indicators associated with the first web service, and for requesting, receiving, and transmitting a network address associated with an intermediary server 148, the application including one or more of a toolbar application or an add-on application, as discussed above.

According to an example embodiment, transmission of content that includes a first executable script to a plurality of devices associated with the distributed client may be initiated, the first executable script including instructions for requesting, receiving, and transmitting the resolved network addresses corresponding to the one or more network location indicators associated with the first web service, and for requesting, receiving, and transmitting a network address associated with an intermediary server (214). For example, the client content distribution component 154 may initiate transmission of content 156 that includes a first executable script to a plurality of devices associated with the distributed client 108, the first executable script including instructions for requesting, receiving, and transmitting the resolved network addresses corresponding to the one or more network location indicators associated with the first web service, and for requesting, receiving, and transmitting a network address associated with an intermediary server 146, as discussed above.

According to an example embodiment, a candidate source of the unauthorized content may be determined based on a result of the determining whether the obtained test content includes unauthorized content (216). For example, the source determination component 140 may determine a source 142 of the unauthorized content, based on a result of the determining whether the obtained test content 132 includes unauthorized content, as discussed above.

According to an example embodiment, determining whether the obtained test content includes unauthorized content may include determining whether the obtained test content includes unauthorized content, based on an analysis of authorized content associated with the first web service (218).

According to an example embodiment, obtaining test content based on one or more of the network addresses included in the first portion may include initiating access to a first test content item based on a first candidate network address included in the first portion, and initiating access to a first legitimate content item based on a first legitimate network address associated with one or more of the network location indicators associated with the first web service (220). For example, the test content collection component 130 may obtain test content 132 based on one or more of the network addresses included in the first portion 110 based on initiating access to a first test content item based on a first candidate network address included in the first portion 110, and initiating access to a first legitimate content item 158 based on a first legitimate network address associated with one or more of the network location indicators associated with the first web service, as discussed above.

According to an example embodiment, determining whether the obtained test content includes unauthorized content may include initiating a comparison of the first test content item and the first legitimate content item, and determining whether the first test content item includes one or more unauthorized modification items based on a result of the comparison of the first test content item and the first legitimate content item (222). For example, the unauthorized content determination component 134 may determine whether the obtained test content 132 includes unauthorized content based on initiating a comparison of the first test content item 132 and the first legitimate content item 158, and determining whether the first test content item 132 includes one or more unauthorized modification items based on a result of the comparison of the first test content item 132 and the first legitimate content item 158, as discussed above.

According to an example embodiment, determining whether the first test content item includes one or more unauthorized modification items may include one or more of determining whether the first test content item includes a search result link that includes one or more unauthorized modification items, determining whether the first test content item includes an advertisement link that includes one or more unauthorized modification items, determining whether the first test content item includes a link item that includes one or more unauthorized modification items, or determining whether the first test content item includes a search result that includes one or more unauthorized modification items (224).

According to an example embodiment, determining whether the first test content item includes one or more unauthorized modification items may include one or more of following links included in the first test content item and storing retrieved content, or determining whether the first test content item includes unauthorized redirect links (226).

According to an example embodiment, a second portion of the obtained network addresses may include network addresses associated with a plurality of devices hosting the distributed client (228).

According to an example embodiment, a third portion of the obtained network addresses may include network addresses associated with intermediary servers in communication with one or more of the plurality of devices hosting the distributed client (230).

According to an example embodiment, the intermediary servers may include at least one Local Domain Name Server (LDNS) (232). According to an example embodiment, a candidate source of the unauthorized content may be determined, based on a result of the determining whether the obtained test content includes unauthorized content based on determining whether the LDNS is a participant server source of the unauthorized content based on aggregating indicators associated with the devices hosting the distributed client that are associated with receipt of unauthorized content, and are served by the LDNS (234).

According to an example embodiment, the intermediary servers may include at least one Local Domain Name Server (LDNS) (236). According to an example embodiment, a candidate source of the unauthorized content may be determined, based on a result of the determining whether the obtained test content includes unauthorized content based on determining an Internet Service Provider (ISP) associated with each device hosting the distributed client that is associated with receipt of unauthorized content, based on an Autonomous System Number (ASN), and determining whether the ISP is a participant server source of the unauthorized content based on aggregating indicators associated with the devices hosting the distributed client that are associated with receipt of unauthorized content, that are associated with the ISP (238).

According to an example embodiment, a set of the obtained plurality of network addresses from the distributed client may be obtained based on one or more of receiving a transmission of the set based on execution of a Java application embedded in web page content, or receiving a transmission of the set from an add-on application instrumented on at least one client device associated with a testing web service (240).

According to an example embodiment, a candidate source of the unauthorized content may be determined based on determining whether a device hosting the distributed client that is associated with receipt of unauthorized content includes executable code that is configured to intercept DNS queries and provide unauthorized responses (242).

Figure 3:
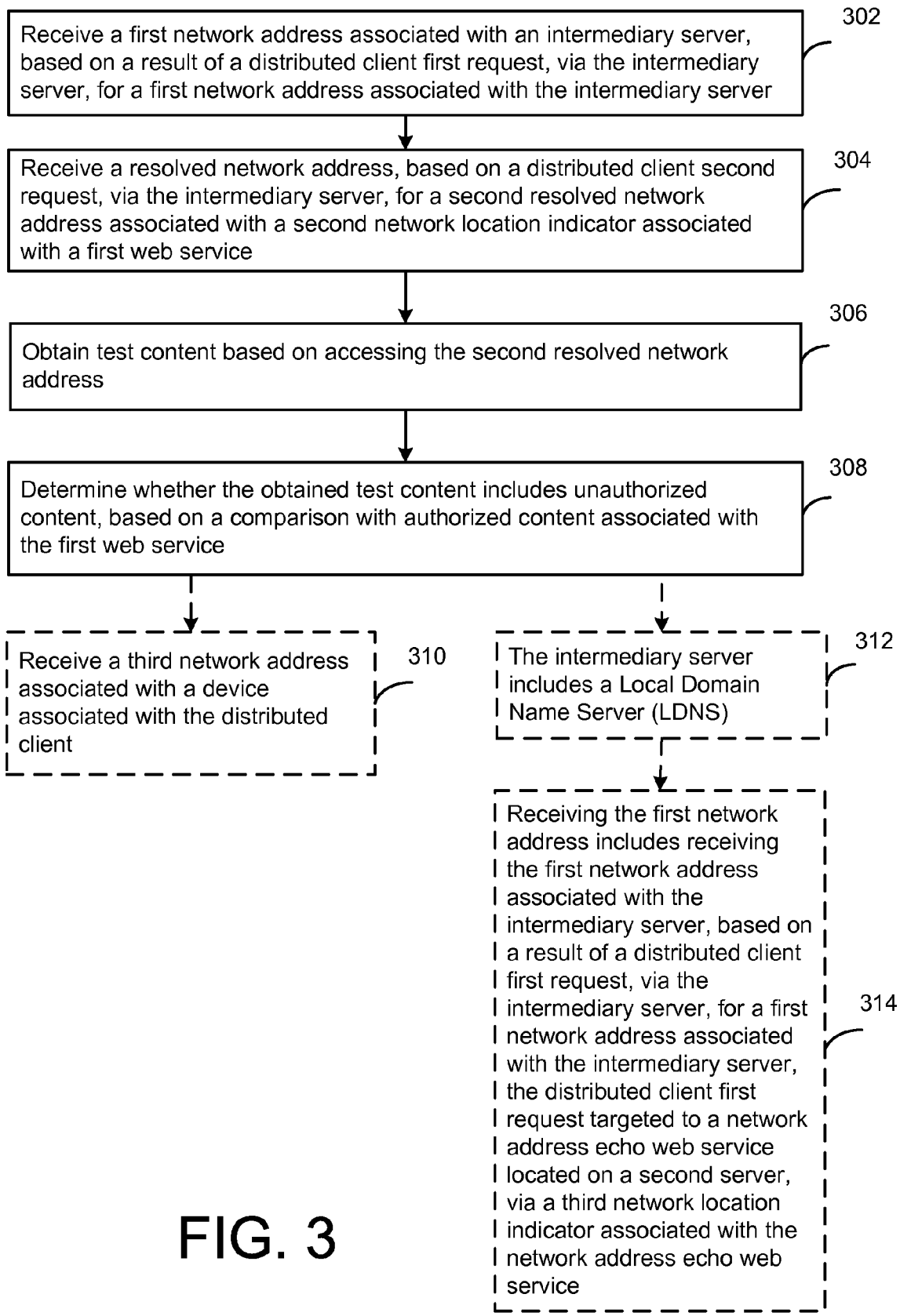
FIG. 3 is a flowchart illustrating example operations of the system of FIG. 1.

FIG. 3 is a flowchart illustrating example operations of a distributed client device 108 associated with the system of FIG. 1, according to example embodiments. In the example of FIG. 3, a first network address associated with an intermediary server, based on a result of a distributed client first request, via the intermediary server, for a first network address associated with the intermediary server, may be received (302). For example, the first request may include a request for the IP address of an LDNS associated with a particular client device 108, as discussed further below. For example, the intermediary server may include the LDNS.

A resolved network address, based on a distributed client second request, via the intermediary server, for a second resolved network address associated with a second network location indicator associated with a first web service, may be received (304). For example, a resolved network address associated with a URL associated with a web service may be included in a response to a distributed client second request directed to an LDNS.

Test content may be obtained based on accessing the second resolved network address (306). It may be determined, via a device processor, whether the obtained test content includes unauthorized content, based on a comparison with authorized content associated with the first web service (308).

According to an example embodiment, a third network address associated with a device associated with the distributed client may be received (310). For example, the IP address associated with the client device 108 may be received at the address collection component 104 with the LDNS IP address and the returned resolved network address 110.

According to an example embodiment, the intermediary server may include a Local Domain Name Server (LDNS) (312).

According to an example embodiment, receiving the first network address may include receiving the first network address associated with the intermediary server, based on a result of a distributed client first request, via the intermediary server, for a first network address associated with the intermediary server, the distributed client first request targeted to a network address echo web service located on a second server, via a third network location indicator associated with the network address echo web service (314).

As discussed above, when a user requests content from a web service such as a cloud service provider, the content sent by the provider may be modified inflight by third-party entities, in some situations. Example techniques discussed herein may provide a lightweight experiment that may include instrumenting a large number of clients to make at least two additional DNS queries on a daily basis. Example techniques discussed herein may thus identify candidate rogue servers.

Example techniques discussed herein may provide a measurement methodology for determining, for each candidate rogue server, whether the server is performing inflight modifications or not. In experimental testing of the example techniques (as discussed below), 349 servers were determined as malicious, that is, as modifying content inflight, and more than 1.9% of all U.S. clients were determined as being affected by these malicious servers.

Experimental testing has included investigating the root causes of the modifications. The experimental testing has identified 9 ISPs, whose clients seem to be predominately affected. The experimental testing has led to a conjecture that the root cause is not sophisticated transparent in-network services, but local DNS servers associated with the problematic ISPs.

Online advertising has been utilized by businesses for many years. As a rapidly expanding Internet business, online advertising is profitable such that large companies (e.g., GOOGLE) with tens of thousands of employees and tens of billions of revenue can build their entire business around online advertising. However, there also exist rogue companies that secretly "steal" advertisement revenue from existing providers.

When users access content services, it is sometimes possible that content delivered from the service providers to the users may be modified inflight. Such modifications may change the content itself, the embedded advertisements, or may redirect users to undesirable destinations.

According to example embodiments, techniques discussed herein may be used to analyze and determine the extent and the primary root causes of the modification problem. A cloud service provider (e.g., FACEBOOK, GOOGLE, MICROSOFT, YAHOO!) may wish to determine what fraction of its users are subject to inflight modifications, and what types of modifications are usually occurring.

Further, cloud service providers may wish to identify the root causes of the inflight modifications, so that they may take appropriate actions to defend their businesses. For example, if evidence shows that the modifications are carried out by Internet Services Providers (ISPs), then complaints may be made to regulatory agencies or legal actions may be taken. Alternatively, if evidence shows that the modifications are due to the effects of malware on the users, then alerting the users and offering solutions to combat the malicious software may be more appropriate.

According to example embodiments, example techniques discussed herein may provide a lightweight experiment for instrumenting a large number of clients, for example, to make at least two additional DNS queries daily (or on a predetermined schedule). By aggregating the data collected from many clients, many candidate rogue servers may be identified.

According to example embodiments, example techniques discussed herein may provide measurement techniques to determine, for each candidate rogue server, whether the server is performing inflight modifications or whether it is benign. For example, experimental results indicated 4,437 candidate rogue servers, 349 were deemed malicious, i.e., were modifying content inflight. According to experimental results, more than 1.9% of all U.S. clients may be affected by these malicious servers.

According to example embodiments, example techniques discussed herein may investigate the root causes of the problem. For example, experimental results indicated 9 ISP's whose clients were predominately affected. The experimental results indicated that the root cause was not sophisticated transparent in-network services, but local DNS servers in the problematic ISPs.

As discussed further below, a cloud provider (e.g., www.example.com) may use an example technique to determine servers that are candidates for making inflight modifications of its content. Additionally, the example technique may determine for each candidate server, the IP addresses of the clients that are obtaining content from the server, and for each such client in the wild, the IP address of the Local DNS (LDNS) server the client is using.

According to an example embodiment, a system may instrument a large number of clients in the wild, such that each client makes lightweight measurements. For example, each instrumented client infrequently resolves www.example.com, then reports to a data collection server three pieces of information: (i) the IP address of the client; (ii) the IP address of the LDNS used by the client to resolve www.example.com; and (iii) the IP addresses of the servers returned by the LDNS when resolving www.example.com. The servers returned by the LDNS's become "candidate rogue servers." Some of the candidate servers may be legitimate servers operated by www.example.com or one of its partners; other candidate servers may actually be rogue servers that perform inflight modifications.

To collect this data, each instrumented client regularly (e.g., once daily) resolves the hostname www.example.com. During this DNS resolution process, the client sends a DNS query to a local DNS server (LDNS), which may be (but not always) operated by the client's Internet Service Provider (ISP). The LDNS interacts with the DNS system, and returns the answer back to the client. The instrumented client may then send to the data collection server its IP address, the IP address of its LDNS server, and the IP addresses of the servers returned by its LDNS.

As discussed above, the instrumented client reports the IP address of its LDNS (as well as its own IP address and the server IP addresses). For example, the LDNS IP address may be obtained directly from the client's OS. However, such direct access to the LDNS IP address may not be possible. Thus, a lightweight technique, referred to herein as DNS Echo, may be implemented via many instrumentation techniques.

Figure 4:
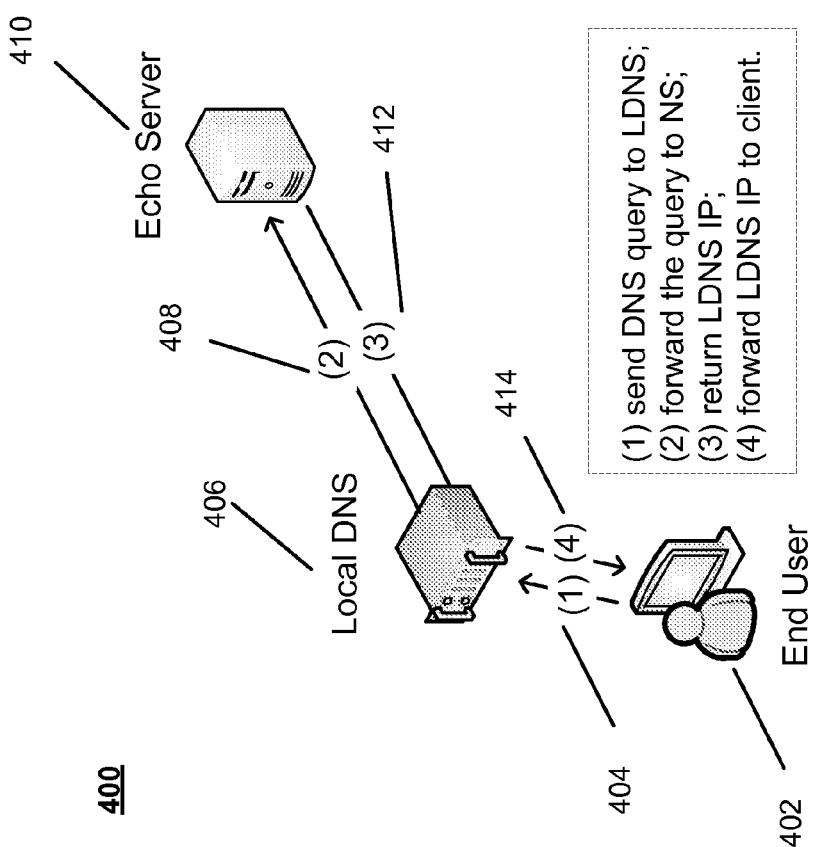
FIG. 4 is a block diagram of an example system for obtaining an echo network address.

FIG. 4 is a block diagram of an example system for obtaining an echo network address. A predetermined hostname (e.g., echo.example.com) may be used for this example technique. The authoritative name server (NS) for the domain echo.example.com may be configured to respond to any DNS query for echo.example.com with the source IP address of the query. Thus, when an LDNS server queries the authoritative name server for echo.example.com, it obtains an answer that includes the IP address of itself. This IP address (of the LDNS server) may then be returned to the client that initiated the DNS query.

As shown in FIG. 4, an end user 402 may send a DNS query (404) to an LDNS 406. The LDNS 406 may forward the query (408) to an NS (echo server) 410, which then returns the LDNS IP address (412) to the LDNS 406. The LDNS 406 may then forward (414) the LDNS IP to the end user 402.

According to experiments, many rogue LDNS servers may interfere with the DNS resolution of a few selected domains, and they may handle other domains in a normal manner.

According to an example embodiment, the instrumented clients in the wild may be configured to resolve two hostnames—www.example.com and echo.example.com—and report the obtained IP addresses, as well as the client's own IP address, to the data collection server. According to an example embodiment, a Java Applet may be embedded with such functionality in popular web pages. When a client visits the web pages of www.example.com, its browser may then load and execute the Java Applet, which may then resolve the hostnames and report the IP addresses to the data collection server. Alternatively, the functionality may be integrated into popular software that is distributed to worldwide clients.

According to an example embodiment, the functionality may be included in a piece of software downloaded and used by a large number of users (e.g., an optional piece of software). Many instances of the software periodically execute the functionality and report the obtained IP addresses to the data collection server (e.g., via the address collection component 104 discussed above).

According to an example embodiment, the clients do not establish any connections with the obtained IP addresses—they merely perform two DNS queries and report the IP addresses. Each DNS query includes a small number of bytes, so the example technique generates minimal additional traffic for each client. The report from a client may reveal the client's IP address (and no other information that may identify the client). However, the same address is already available when the client downloads the software. Therefore, the example technique does not reveal any additional identifying information about the clients. In addition, data may be collected only from users who have opted in to share with the service provider data that will help improve their experience, and it may be anonymized (e.g., after 6 months in accordance with a provider's data privacy policies).

In accordance with experimental testing, inflight modifications for a popular Internet search service, which are referred to herein as www.example.com, through the instrumentation discussed above, IP addresses may be collected for www.example.com that may be resolved by a large number of clients in the wild. Each of the collected IP addresses may be a candidate for a rogue server that performs inflight modification. According to an example embodiment, a technique referred o herein as the Revealer Platform may be used to determine which of these servers are rogue servers, as discussed further below.

Not all candidate servers in the list are necessarily problematic. For example, a simple web proxy may be included in the list, even though it does not modify content. According to an example embodiment, a semi-automatic framework may probe individual servers in the list and may identify the problematic servers.

According to an example embodiment, for each candidate server, the content may be accessed via the candidate server and also directly from www.example.com. The server may be indicated as benign if the content is the same. However, the server may be indicated as malicious if it produces different content, such as inserting or modifying advertisements.

According to an example embodiment, the Revealer Framework may be scripted using a Chickenfoot browser automation framework, and may employ a semi-automatic verification procedure. As Chickenfoot may operate as an extension of Firefox, the Firefox browser may be used.

Figure 5:
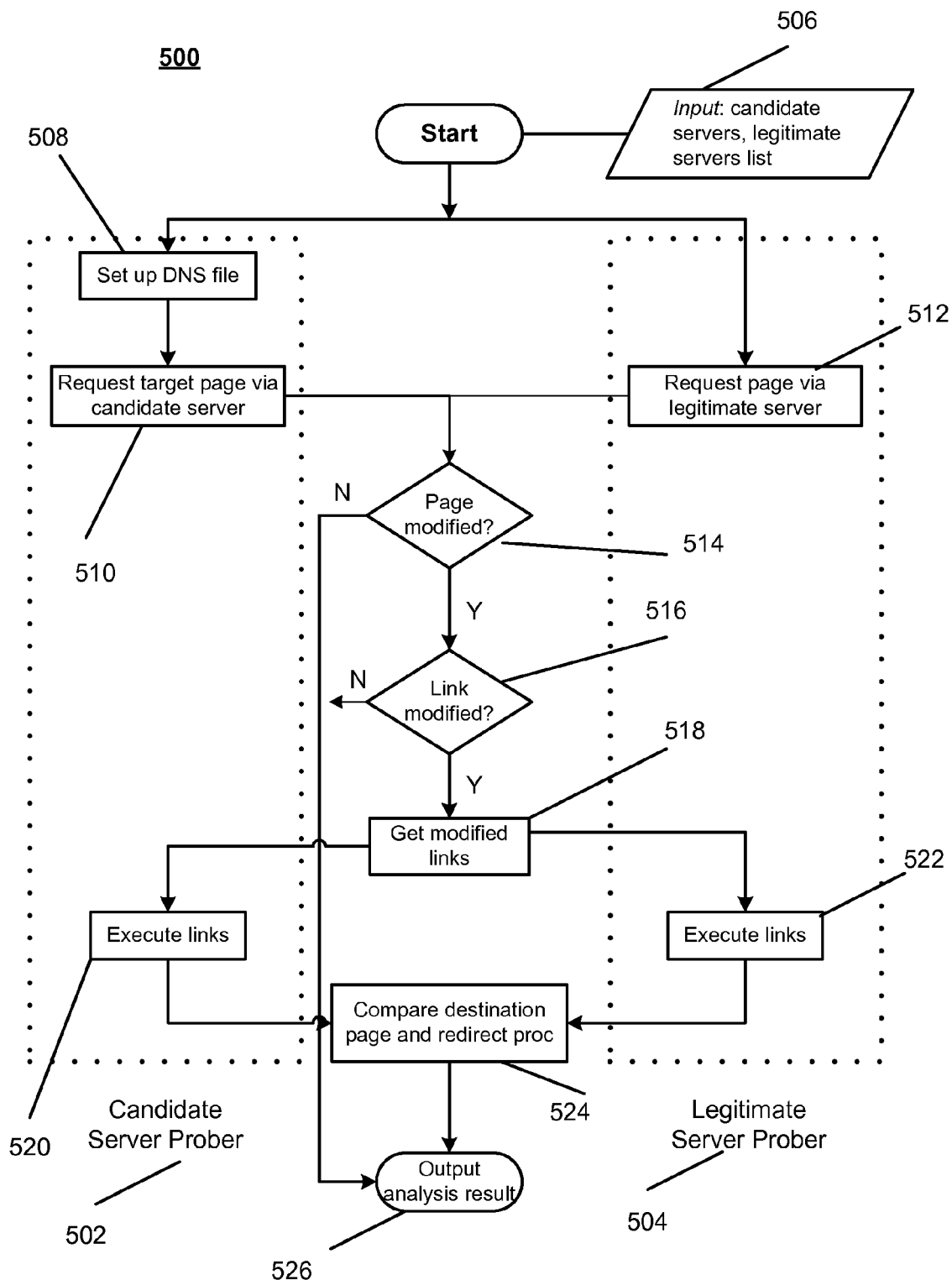
FIG. 5 is a flowchart illustrating example operations of a system for unauthorized content source determination.

FIG. 5 is a flowchart illustrating example operations of a system for unauthorized content source determination. As shown in FIG. 5, the example Revealer technique may include three components: a controller and two Chickenfoot-based script instances. According to an example embodiment, the controller may iterate through a list of search query URLs and may assign them one by one to both instances. One instance, shown in FIG. 5 as Candidate Server Prober 502, may retrieve the URL from the candidate server. The other, shown in FIG. 5 as Legitimate Server Prober 504, may retrieve from a corresponding legitimate server. According to an example embodiment, the two instances may run on two different machines with the same configuration and may be synchronized using a shared file lock. The content retrieved through both probers may be compared to determine whether the candidate server is malicious.

As shown in FIG. 5, input to the system may include a list of candidate servers and a list of legitimate servers 506. A DNS file may be set up (508) by the candidate server prober 502, and a target page may be requested via a candidate server (510). The legitimate server prober 504 may request the target page via a legitimate server (512). A comparison may be performed (514) between the received pages to determine whether the page has been modified by the candidate server.

If the page has been modified, it may be determined whether a link has been modified (516). If one or more links have been modified, the links are executed (520, 522) and an analysis is performed to determine results of redirection (524). The results of the analysis are output (526) if pages are not modified (at 514), links are not modified (at 516), and after the analysis at 524.

According to an example embodiment, in order to force the browser to access the service through the candidate server, Candidate Server Prober 502 may first modify the local DNS resolution file so that www.example.com points to the candidate server. According to an example embodiment, a tshark packet sniffer may be initiated to capture all incoming and outgoing HyperText Transfer Protocol (HTTP) traffic. According to an example embodiment, Candidate Server Prober 502 may then start Firefox, which may load the Chickenfoot scripts to retrieve a specified URL. The retrieved content may be saved to local storage for further analysis. According to an example embodiment, Legitimate Server Prober 504 may perform similarly to retrieve content from a legitimate server.

According to an example embodiment, the controller may compare the files fetched through the candidate server and from the legitimate server. According to an example embodiment, if a text string is changed, the candidate server may be indicated as problematic. If a link-related modification is detected, more testing may be performed.

Because a cloud service may include an Internet search service, the search results may be accompanied by advertisements. Therefore, given the same query, when fetching two pages at the same time from the same host, the search result pages may be different if different ads are generated by the advertising system. In this case, when link-related changes are detected, the different links may be sent to the Legit Server Prober 504 and executed, for example, in the Firefox browser. If these links are not recognized due to the modification which was made on the path to the client, the legitimate search server may indicate an error such as "web page doesn't exist." For example, a modified link, http://www.bing.com/aff?p=JZLjk***, may not be served by BING servers.

At the Candidate Server Prober 502 side, for links different from the links from the Legit Server Prober 504, Revealer may follow the URLs embedded in the web page, as if users are clicking the corresponding links in the page. The Chickenfoot extension may not directly access the HTML document. Instead, it may access the objects, referred to as internal Document Object Model (DOM) trees, from rendered HTML documents. Therefore, Chickenfoot may locate embedded URLs in the DOM through string matching, and may load these URLs to emulate users clicking the links. The click operation may thus trigger the execution of JavaScript functions that may have been inserted by the candidate server. Thus, following the links may aid in detecting such insertions, while fetching the web page for the specified search URL may not trigger the Javascript functions.

The two files retrieved through the candidate server and the legitimate server may be compared to identify modifications (524). Further, any referenced pages generated by the two servers may be compared. If there is a difference, then the candidate server may have performed inflight modification. According to an example embodiment, each detected malicious server may be output to a text file, and then removed from the list. According to an example embodiment, Revealer may continue testing the servers on the list in a round-robin technique, as malicious servers may randomly choose to modify pages.

As discussed further below, several types of modifications may be detected by Revealer techniques discussed herein.

For example, result links may be replaced in a search result web page. For example, when searching "dell computers," the correct result page may include a link pointing to an entry about Dell on Wikipedia. However, a malicious server may returns a page for which the text of the link still refers to Wikipedia, but the link may be changed, for example, to http://www.example.com/goto?id=5d***.

If a user clicks the modified link, he/she may be directed to a third party web site, instead of Wikipedia. This type of modification is not difficult to identify.

In this example, the modified link points to www.example.com, instead of the third party website. Such a modification may ensure that, when the user clicks the modified link, he/she may again connect to the malicious server, which may then redirect the user to an arbitrary third party web site.

As another example, advertisement links may be modified. For example, a correct advertisement link such as http://www.example.com/?Id=* may be replaced by http://www.example.com/aff?p=*.

If the user clicks the link, he/she may visit an advertisement that is different from the original one. The modification is the request parameter after the hostname. Ordinary users may not notice such modification; however, the modification may be detected when the links obtained from the candidate server are compared to the correct ones from a legitimate server.

As yet another example, a malicious server may not modify search result links or advertisement links, but may instead insert JavaScript code into the result page, which may then modify the links when the user clicks them. When the modified page is displayed in the user's browser, the result links and advertisement links may appear normal (e.g., when the user moves a mouse over the links). However, when a link is clicked, the JavaScript code may be invoked with the original link as a parameter. The JavaScript code may return a new link, which may ultimately load a completely different web page. Such a modification may seem inconspicuous, as it may not be identified even by comparing all the links. However, this type of modification may be discovered if the browser follows each link in the result page and saves the retrieved content from the links.

As another example, a malicious server may not modify the result or advertisement links, but may instead redirect the query. For example, malicious servers may employ at least two types of redirection. A first type may redirect a search query to a different search engine. A second type may insert several rounds of redirection before eventually directing the user to his/her destination.

For example, economic incentives may motivate the second type of redirection. For example, inserted links may be related to online advertisement companies. These companies may be paid when their advertisement links are clicked by users. The extra rounds of inserted redirection may thus be used to generate clicks, as though they are generated by a large number of real users.

Further, this type of modification may be stealthy, as it may intercept and redirect if the search queries are generated from the address bar of web browsers. Intercepting the queries from the address bar may reduce the risk of exposing the malicious servers.

As another example, a malicious server may aggressively modify the result web pages. For example, a malicious server may insert banner advertisements in the home page of a search service, or it may replace the result pages with different contents, links, and ads.

Table 1 as shown below provides a summary of the types of malicious servers discovered in experimental results using example techniques discussed herein. For example, in a total of 349 detected malicious servers, 154 redirected requests from the address bar and 72 inserted Javascript.

TABLE 1

| Type of proxy | # of IP |
|---|---|
| Modify search result links | 41 |
| Modify ad links | 80 |
| Javascript injection | 72 |
| Redirect requests from address bar | 154 |
| Modify whole search results | 1 |
| Inject ads on homepage | 1 |

As discussed below, the client population affected by the identified malicious servers may be analyzed.

In the experimental results, a dataset included 15,688,909 unique clients worldwide. Among the clients, approximately 0.9% (137,871) were (at least once) directed to one of the 349 malicious servers identified by Revealer techniques. The percentage was even more significant among the clients in the U.S., reaching 1.9%.

According to an example embodiment, the Autonomous System Number (ASN) of each client, affected by the malicious servers, may be obtained by looking up the client IP address in the Quova IP GeoLocation database. According to an example embodiment, the ASN may be mapped to its ISP, and the clients within the same ISP may be aggregated together.

In the experimental results, 1,549 ISPs were thus indicated as affected. The number of affected ISPs to was reduced to 79 by removing ISPs with less than 50 affected clients. After this filtering, the total number of affected clients was 131,358. In the experimental results, some ISPs were indicated as heavily affected whereas the majority of the ISPs were indicated as minimally affected. For example, for 9 ISPs, more than 65% of the clients were indicated as affected, whereas ISPs ranked 17 or larger were indicated as having less than 0.22% of their clients affected.

In addition to determining how many clients may be subject to inflight modifications, and where the clients come from, a cloud provider may appreciate an ability to identify the root causes of the modifications. As discussed above, a high percentage of clients from several ISPs may experience inflight modifications to their retrieved web pages. This observation alone, however, does not necessarily imply that these ISPs are involved in the modifications. For example, the clients' local machines may be compromised by malicious software (e.g., Bahama botnet) which may direct their search queries to the malicious servers.

According to an example embodiment, the root cause may be identified via correlation analysis techniques, as discussed further below.

Through active probing of the malicious web servers, it may be determined that they behave differently from general purpose web proxies. For example, these malicious web servers may reject most domains other than example.com (and a small number of other cloud companies). Thus, the affected clients may connect to the malicious web servers when they access example.com (and the small number of other cloud companies); otherwise, their access to other web sites may be interrupted, which may alert the clients. For example, when the clients resolve www.example.com, the DNS resolution process may be compromised in one of the DNS stages. Since the DNS resolution may be handled by the clients' local DNS (LDNS), it may be examined for suspicious behavior.

As discussed above, during data collection, each client's LDNS server may be determined. For each LDNS server, the clients that use that LDNS may be aggregated. Based on the percentage of affected clients, each LDNS may be classified as compromised, healthy, or inconclusive.

In experimental results, the example DNS Echo platform collected 191,479 LDNS IP addresses. Among the LDNS IPs, there were 5,129 associated with the affected clients. For example, these LDNS IPs may be grouped by/24 prefix to obtain a list of 2,284 prefixes. For example, prefixes that are associated with less than 50 affected clients (e.g., deemed as statistically insignificant) may be removed, thus leaving 108 LDNS prefixes, which belong to 15 ISPs.

Figure 6:
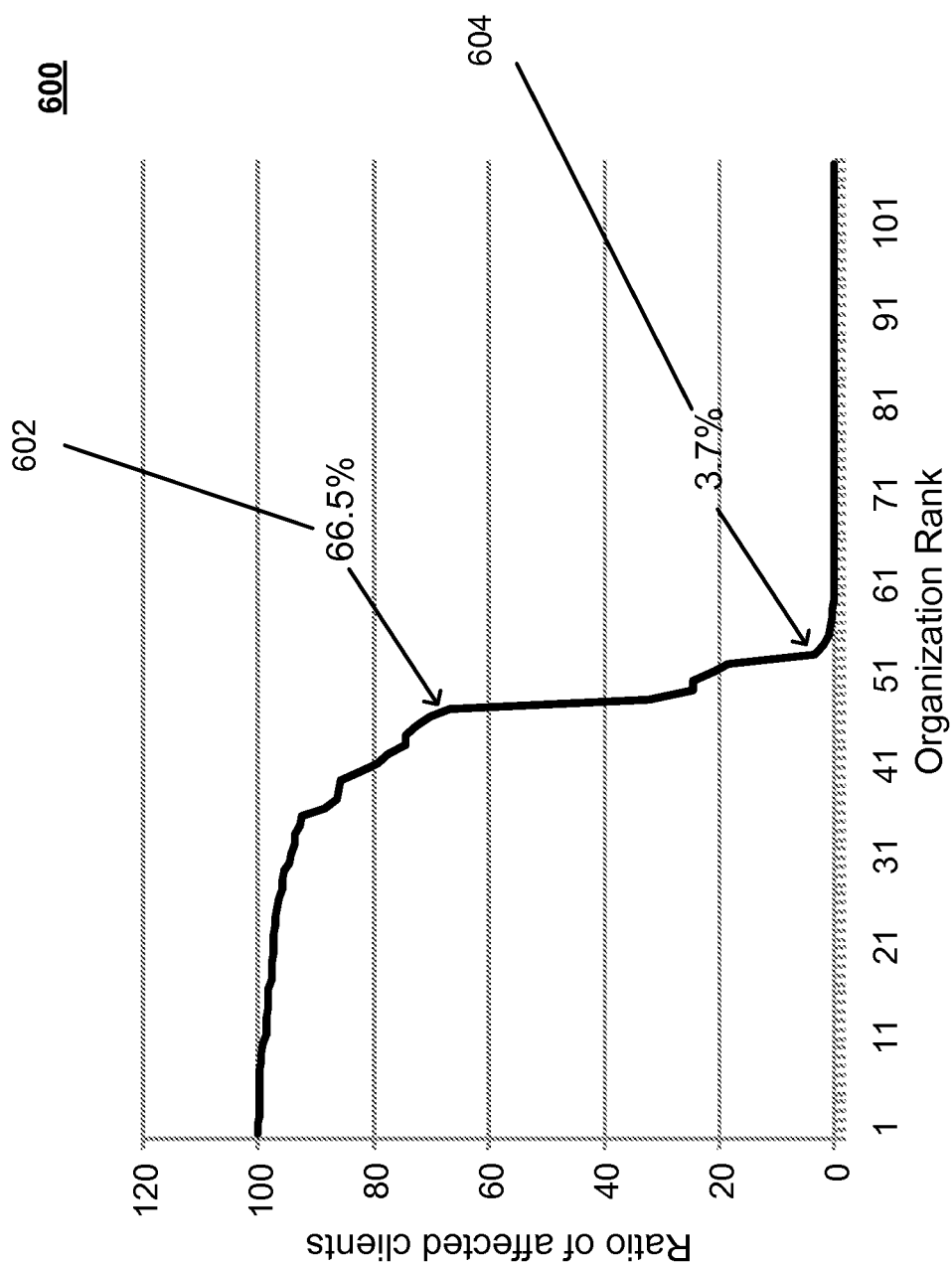
FIG. 6 depicts a curve that illustrates example ratios of affected clients.

FIG. 6 depicts a curve that illustrates example ratios of affected clients. As shown, FIG. 6 illustrates a plot of the LDNS prefixes against the affected ratio. As shown in FIG. 6, the affectation ratios vary significantly among the various LDNS's. As shown in FIG. 6, there are clear turning-points at 66.5% (602) and 3.7% (604). Therefore, two thresholds of 60% and 5% may be selected for classification. For example, a LDNS may be classified as compromised if the affected ratio is larger than 60%, and may be classified as healthy if the ratio is less than 5%. The LDNS's in-between may be classified as inconclusive. In the experimental results, more than 95% of the LDNS's were indicated as either compromised (48) or healthy (55).

Not all LDNS's are deployed by ISP's. For an LDNS deployed by an ISP, it may be expected that it would mostly service clients from the same ISP. Based on this assumption, an LDNS may be referred to as official to an ISP if more than 50% of the clients using the LDNS are associated with the ISP. In the experimental results, most (44 out of 48) of the compromised LDNS servers were official LDNS servers for 9 ISPs. Furthermore, for each of these ISPs, almost all their LDNS servers were compromised.

Thus, based on the experimental results, the majority of the inflight modifications were caused by a small number of LDNS's that were responding to DNS queries (for small number of cloud service providers) with malicious servers. The malicious servers then performed the inflight modifications. Moreover, a small number of ISPs operated these LDNS's; for each such ISP, most of its LDNS's were compromised.

According to an example embodiment, if all the official LDNS servers of an ISP are identified as comprised, a cloud provider may work to correct the situation. If the LDNS's are compromised because they run the same vulnerable version of DNS software, then the cloud provider may notify the ISP with regard to the problem. If the ISP is voluntarily involved in inflight modifications, then appropriate actions (e.g., legal actions) may be pursued to terminate the malicious activity.

As discussed above, clients may be affected by unauthorized content due to compromised LDNS servers. According to experimental results, such clients may be more likely to obtain correct pages by using external LDNS's. For example, cloud providers such as GOOGLE may offer a public DNS service.

As discussed above, affected clients may be associated with LDNS's that are classified as healthy. The affected clients associated with these LDNS's may be affected by malware in their local hosts; this malware may intercept the DNS query and respond with the malicious server IPs (e.g., as the Bahama botnet may steal traffic from popular search engines).

Example techniques discussed herein may be used to identify sources of unauthorized content.

Customer privacy and confidentiality have been ongoing considerations in online environments for many years. Thus, example techniques for determining unauthorized content sources may use aggregate data with regard to data collection by users, and may thus avoid accessing data that may be personal to particular users. Further, users may be provided with many different types of opportunities to opt out of allowing their identifying information to be used for statistical purposes, including specific user permissions that may be requested before collection of the information. For example, a user may be specifically requested to agree to allow their identifying information to be obtained, before the information is collected. According to an example embodiment herein, personally identifiable information from a user may not be stored in the example system 100.

Implementations of the various techniques described herein may be implemented in digital electronic circuitry, or in computer hardware, firmware, software, or in combinations of them. Implementations may implemented in a propagated signal, or, alternatively, as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
an unauthorized content source determination system embodied via executable instructions stored on at least one machine readable storage device;
at least one device processor configured to execute at least a portion of the executable instructions stored on the machine readable storage device, the unauthorized content source determination system including:
an address collection component that obtains a plurality of network addresses from a distributed client, at least a first portion of the obtained network addresses including resolved network address responses to distributed client requests for resolved network addresses corresponding to one or more network location indicators associated with a first web service, a second portion of the obtained network addresses including network addresses associated with a plurality of devices hosting the distributed client;
a test content collection component that obtains test content based on one or more of the network addresses included in the first portion;
an unauthorized content determination component that determines, via one or more of the at least one device processor, whether the obtained test content includes unauthorized content; and
a source determination component that determines a source of the unauthorized content, based on a result of the determining whether the obtained test content includes unauthorized content, the determining the source of the unauthorized content including aggregating indicators associated with the devices hosting the distributed client that are associated with receipt of the unauthorized content.

2. The system of claim 1, further comprising:
a client instrumentation component that initiates instrumentation of an application to a plurality of devices associated with the distributed client, the application including instructions for requesting, receiving, and transmitting the resolved network addresses corresponding to the one or more network location indicators associated with the first web service, and for requesting, receiving, and transmitting a network address associated with an intermediary server, the application including one or more of a toolbar application or an add-on application.

3. The system of claim 1, further comprising:
a client content distribution component that initiates transmission of content that includes a first executable script to a plurality of devices associated with the distributed client, the first executable script including instructions for requesting, receiving, and transmitting the resolved network addresses corresponding to the one or more network location indicators associated with the first web service, and for requesting, receiving, and transmitting a network address associated with an intermediary server.

4. The system of claim 1, wherein:
the test content collection component obtains test content based on one or more of the network addresses included in the first portion based on:
initiating access to a first test content item based on a first candidate network address included in the first portion, and
initiating access to a first legitimate content item based on a first legitimate network address associated with one or more of the network location indicators associated with the first web service, wherein
the unauthorized content determination component determines whether the obtained test content includes unauthorized content, based on a comparison with authorized content associated with the first web service, based on:
initiating a comparison of the first test content item and the first legitimate content item, and
determining whether the first test content item includes one or more unauthorized modification items based on a result of the comparison of the first test content item and the first legitimate content item.

5. A method comprising:
obtaining a plurality of network addresses from a distributed client, at least a first portion of the obtained network addresses including resolved network address responses to distributed client requests for resolved network addresses corresponding to one or more network location indicators associated with a first web service, a second portion of the obtained network addresses including network addresses associated with a plurality of devices hosting the distributed client;
obtaining test content based on one or more of the network addresses included in the first portion; and
determining, via a device processor, whether the obtained test content includes unauthorized content; and
determining the source of the unauthorized content, the determining the source including aggregating indicators associated with the devices hosting the distributed client that are associated with receipt of the unauthorized content.

6. The method of claim 5, wherein:
the plurality of network addresses obtained from the distributed client include a plurality of Internet Protocol (IP) addresses, and
the one or more network location indicators associated with the first web service include an address portion of one or more Uniform Resource Locators (URLs) associated with the first web service.

7. The method of claim 5, further comprising:
initiating instrumentation of an application to a plurality of devices associated with the distributed client, the application including instructions for requesting, receiving, and transmitting the resolved network addresses corresponding to the one or more network location indicators associated with the first web service, and for requesting, receiving, and transmitting a network address associated with an intermediary server, the application including one or more of a toolbar application or an add-on application.

8. The method of claim 5, further comprising:
initiating transmission of content that includes a first executable script to a plurality of devices associated with the distributed client, the first executable script including instructions for requesting, receiving, and transmitting the resolved network addresses corresponding to the one or more network location indicators associated with the first web service, and for requesting, receiving, and transmitting a network address associated with an intermediary server.

9. The method of claim 5, further comprising:
determining a candidate source of the unauthorized content based on a result of the determining whether the obtained test content includes unauthorized content, wherein:
determining whether the obtained test content includes unauthorized content includes determining whether the obtained test content includes unauthorized content, based on an analysis of authorized content associated with the first web service.

10. The method of claim 5, wherein:
a set of the obtained plurality of network addresses from the distributed client is obtained based on one or more of:
receiving a transmission of the set based on execution of a Java application embedded in web page content, or
receiving a transmission of the set from an add-on application instrumented on at least one client device associated with a testing web service.

11. The method of claim 5, wherein:
obtaining test content based on one or more of the network addresses included in the first portion includes:
initiating access to a first test content item based on a first candidate network address included in the first portion, and
initiating access to a first legitimate content item based on a first legitimate network address associated with one or more of the network location indicators associated with the first web service, wherein
determining whether the obtained test content includes unauthorized content includes:
initiating a comparison of the first test content item and the first legitimate content item, and
determining whether the first test content item includes one or more unauthorized modification items based on a result of the comparison of the first test content item and the first legitimate content item.

12. The method of claim 11, wherein:
determining whether the first test content item includes one or more unauthorized modification items includes one or more of:
determining whether the first test content item includes a search result link that includes one or more unauthorized modification items,
determining whether the first test content item includes an advertisement link that includes one or more unauthorized modification items,
determining whether the first test content item includes a link item that includes one or more unauthorized modification items, or
determining whether the first test content item includes a search result that includes one or more unauthorized modification items.

13. The method of claim 11, wherein:
determining whether the first test content item includes one or more unauthorized modification items includes one or more of:
following links included in the first test content item and storing retrieved content, Or
determining whether the first test content item includes unauthorized redirect links.

14. The method of claim 5, wherein:
a third portion of the obtained network addresses includes network addresses associated with intermediary servers in communication with one or more of the plurality of devices hosting the distributed client.

15. The method of claim 14, wherein:
the intermediary servers include at least one Local Domain Name Server (LDNS), wherein determining the source of the unauthorized content includes:
determining a candidate source of the unauthorized content, based on a result of the determining whether the obtained test content includes unauthorized content, based on determining whether the LDNS is a participant server source of the unauthorized content based on aggregating indicators associated with the devices hosting the distributed client that are associated with receipt of unauthorized content, and are served by the LDNS.

16. The method of claim 14, wherein:
the intermediary servers include at least one Local Domain Name Server (LDNS), wherein determining the source of the unauthorized content includes:
determining a candidate source of the unauthorized content, based on a result of the determining whether the obtained test content includes unauthorized content, based on:
determining an Internet Service Provider (ISP) associated with each device hosting the distributed client that is associated with receipt of unauthorized content, based on an Autonomous System Number (ASN), and
determining whether the ISP is a participant server source of the unauthorized content based on aggregating indicators associated with the devices hosting the distributed client that are associated with receipt of unauthorized content, that are associated with the ISP.

17. The method of claim 5, further comprising:
determining a candidate source of the unauthorized content based on determining whether a device hosting the distributed client that is associated with receipt of unauthorized content includes executable code that is configured to intercept DNS queries and provide unauthorized responses.

18. A computer program product tangibly embodied on a machine readable storage device and including executable code that causes at least one data processing apparatus to:
- receive a first network address associated with an intermediary server, based on a result of a distributed client first request, via the intermediary server, for a first network address associated with the intermediary server, the distributed client first request targeted to a network address echo web service;
- receive a resolved network address, based on a distributed client second request, via the intermediary server, for a second resolved network address associated with a second network location indicator associated with a first web service;
- obtain test content based on accessing the second resolved network address;
- determine, via a device processor, whether the obtained test content includes unauthorized content, based on a comparison with authorized content associated with the first web service; and
- determine a source of the unauthorized content, based on a result of the determining whether the obtained test content includes unauthorized content, the determining the source of the unauthorized content including aggregating indicators associated with devices hosting the distributed client that are associated with receipt of the unauthorized content.

19. The computer program product of claim 18, wherein the executable code causes at least one data processing apparatus to:
- receive a third network address associated with a device associated with the distributed client.

20. The computer program product of claim 18, wherein:
- the intermediary server includes a Local Domain Name Server (LDNS), and
- receiving the first network address includes receiving the first network address associated with the intermediary server, based on the result of the distributed client first request, via the intermediary server, for the first network address associated with the intermediary server, the distributed client first request targeted to the network address echo web service located on a second server, via a third network location indicator associated with the network address echo web service.

* * * * *